A. W. COFFINGER, Jr.
DRILLING MACHINE.
APPLICATION FILED OCT. 5, 1912.
1,082,150.
Patented Dec. 23, 1913.
2 SHEETS—SHEET 1.
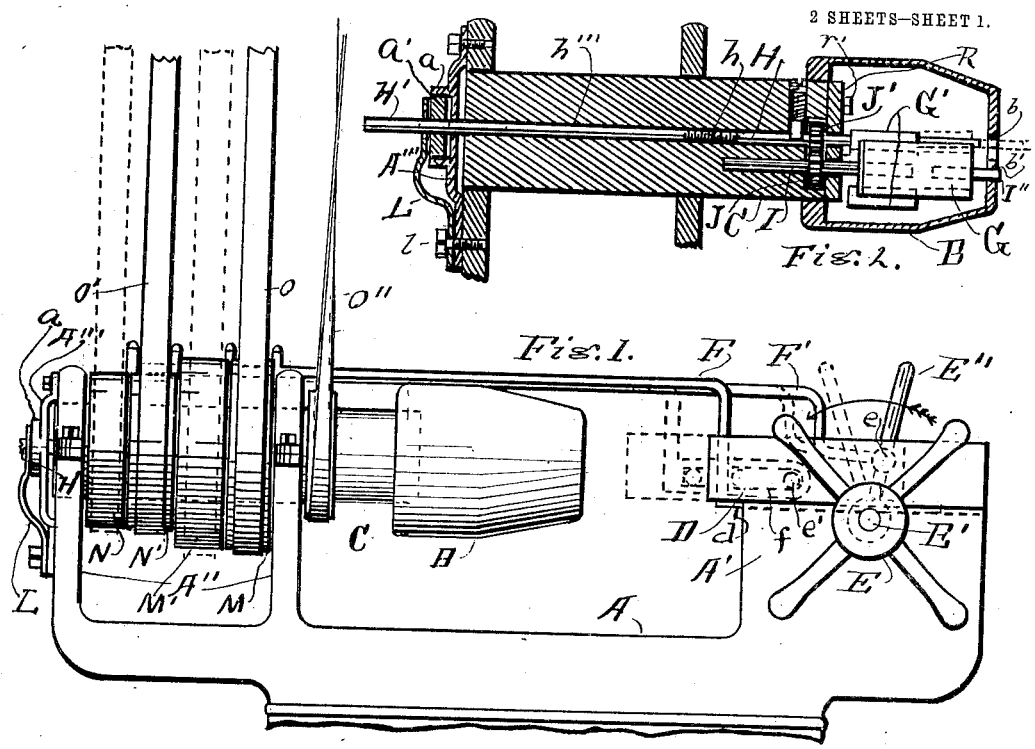
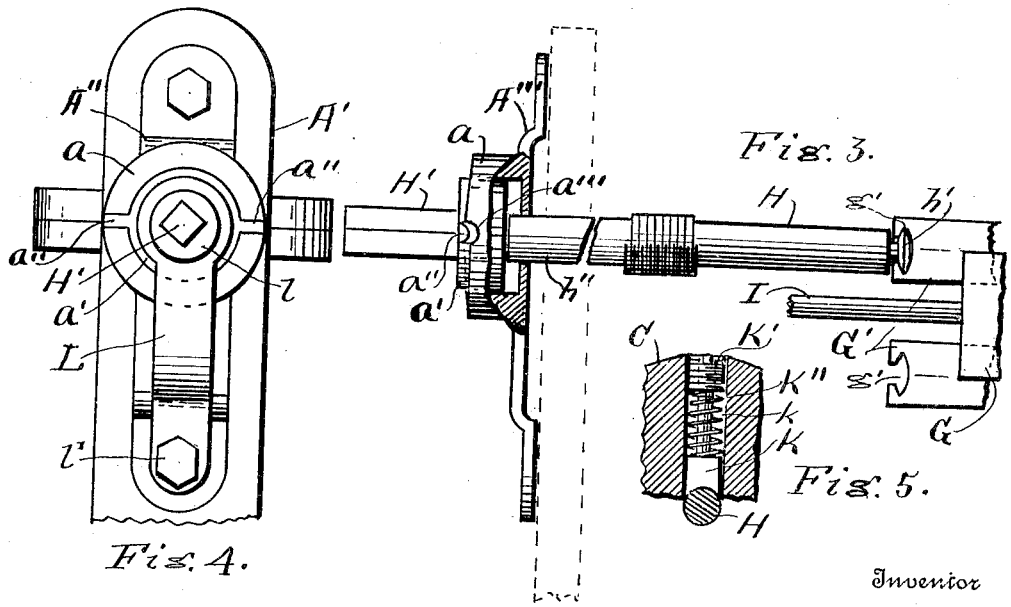
Witnesses
G. E. Cilley
James Cilley
Inventor
Arthur W. Coffinger, Jr.
By
Jehiel J. Cilley
Attorney

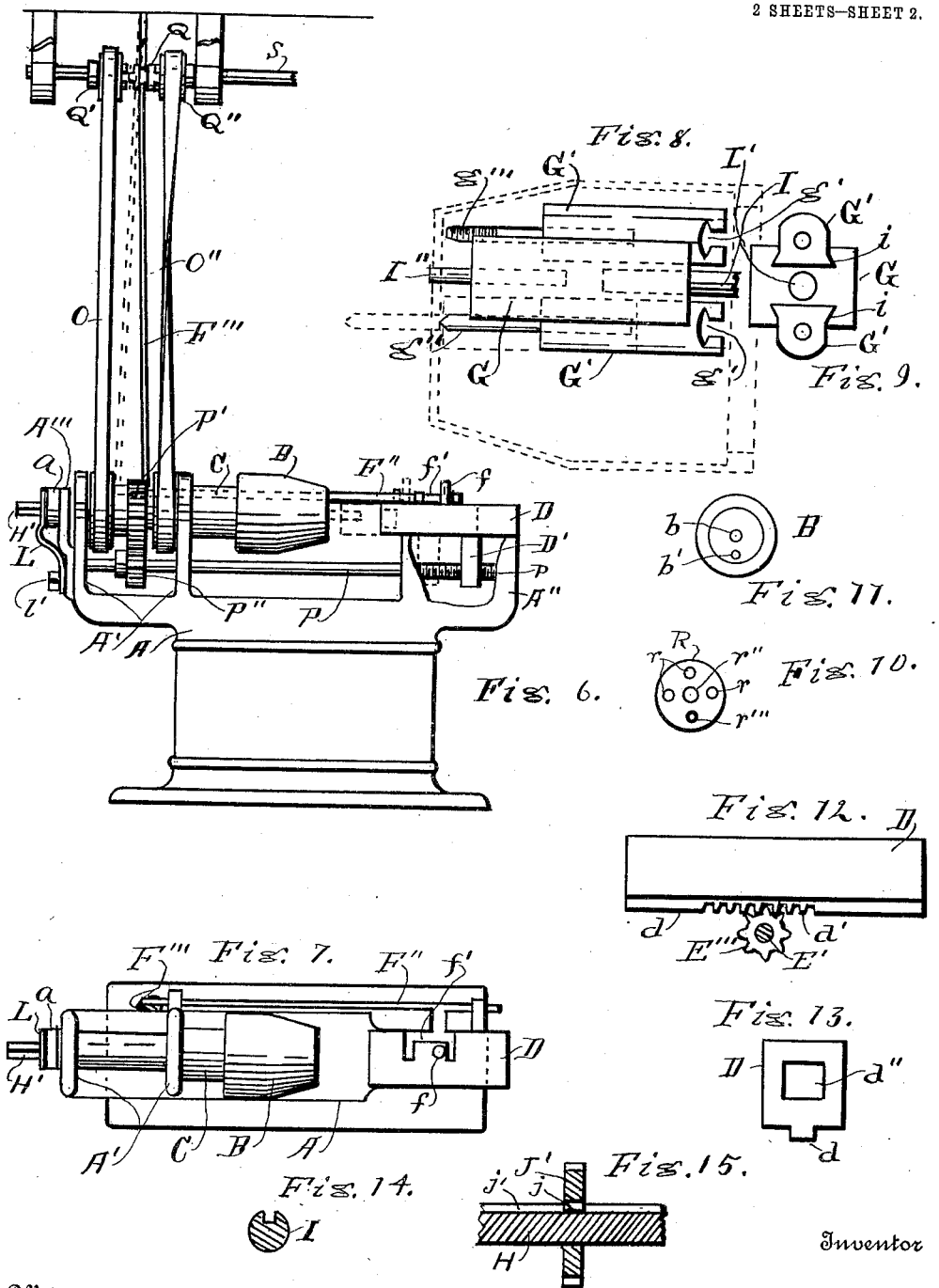

UNITED STATES PATENT OFFICE.

ARTHUR W. COFFINGER, JR., OF GRAND RAPIDS, MICHIGAN.

DRILLING-MACHINE.

1,082,150.  Specification of Letters Patent.  Patented Dec. 23, 1913.

Application filed October 5, 1912.  Serial No. 724,221.

*To all whom it may concern:*

Be it known that I, ARTHUR W. COFFINGER, Jr., a citizen of the United States, residing at Grand Rapids, in the county of Kent and State of Michigan, have invented certain new and useful Improvements in Drilling-Machines, of which the following is a specification.

My invention relates to improvements in machines for drilling and tapping, or countersinking metal furniture attachments, and its objects are: First, to provide a machine with which the drilling and tapping, reaming or countersinking of small metal articles may be done without removing the articles from the holders for the complete operation. Second, to provide a means for insuring the positive movement of the drilling and tapping elements of the machine. Third, to provide a means whereby the movements of the machine may be made automatic. Fourth, to provide a means whereby the actuating element for the drill and tap may be held firmly from rotary movement when actuating the drill or tap longitudinally and whereby it will be made to revolve positively at the required instant, and, sixth, to provide for holding the bed that supports the drill and tap carriages, in perfect and steady alinement at all times. I attain these objects by the mechanism illustrated in the accompanying drawing, in which—

Figure 1 is a side elevation of the machine showing a means for actuating the stock carriage manually. Fig. 2 is a longitudinal section of the drill head and chuck showing the manner of supporting and actuating the drill and tap carriages. Fig. 3 is a detached view of the actuating shaft showing how it is made to engage the drill carriage for forcing it longitudinally forward and backward in the process of drilling or tapping an article, and, also, showing the mechanism for anchoring and releasing this shaft at the desired times. Fig. 4 is an end elevation of the upper part of the machine showing the anchoring mechanism. Fig. 5 is a small section of the machine head or mandrel disclosing the manner of applying the brake that causes the actuating shaft to turn with the mandrel at the proper time. Fig. 6 is a side elevation of a complete machine arranged to operate the feed and drill mechanism automatically. Fig. 7 is a plan of the same with all pulleys removed. Fig. 8 is a detached elevation of the drill and tap carriages and their supporting bed. Fig. 9 is an end view of the same. Fig. 10 is an elevation of the bearing plate that is secured to the end of the mandrel to form a bearing for the carriage supporting shaft. Fig. 11 is a like view of the front end of the chuck head. Fig. 12 a side elevation of the stock carriage showing the manner of applying means for actuating the carriage manually. Fig. 13 is an end elevation of the same. Fig. 14 is a sectional end view of the actuating shaft showing a groove for the reception and free longitudinal movement of a spline in the actuating gear, and Fig. 15 is a longitudinal section of the same.

In the construction of this machine I make use of any properly constructed supporting frame, as A, having proper pillow blocks or shaft bearings, as A′, and a bed for the support of the stock carriage D, as indicated at A″. The stock carriage is made to reciprocate longitudinally either manually, by means of the disk E and its integral levers, the shaft E′ and the gear wheel and gear E‴ and d′, the gear d′ being cut from the guiding rib d, as shown in Fig. 12, or automatically, as indicated in Fig. 6, by means of the actuating shaft P and screw p acting upon the arm D′; said shaft being actuated from the mandrel C by means of the gear wheels P′ and P″, shown in Fig. 6.

The chuck head B is hollow for the reception and free action of the carriage ways G and the carriages G′, and is securely mounted on the end of the mandrel C, as indicated in Fig. 1, and the mandrel C has a centrally located longitudinal opening h‴ for the reception and free action of the actuating shaft H. This shaft has a screw threaded part h that is made to mesh with corresponding threads in the mandrel so that when the mandrel is made to revolve the shaft H will be forced either to the right or to the left as the mandrel is made to revolve forward or backward. The back end of the shaft H is made square, as at H′, to pass freely through the collar $a'$, which collar is provided with short arms or pintles $a''$ designed to engage the depressions $a'''$ in the cylinder $a$ on the arm $A'''$ so as to hold the shaft H from turning with the mandrel so that it will be moved to the right or left to move the carriages $G'$ in the desired direction, as hereinafter more fully described. At the junction between the square part $H'$ and the round part of the shaft H a shoulder $h''$ is formed, and as the shaft is moving backward, or to the left, this shoulder comes in contact with the inner surface of the sleeve $a'$ and moves it sufficiently to carry the arms $a''$ out of the depressions $a'''$, so that when the rotary movement of the mandrel is reversed the shaft will be carried one half way around and as it has moved longitudinally to the right the shoulder $h''$ will have moved far enough to allow the pintles to again engage the depressions $h''$ and hold the shaft from turning further. The collar $a'$ is held to normal position inside the cylinder $a$ by means of a spring, as L, properly secured to the machine, as at $l$. It will be noticed that the metal at the upper side of the depression $a'''$ projects somewhat farther from the bottom of the depression than that on the lower side of said depression. This is for the purpose of preventing the collar $a'$ from being turned backward when the shaft is carried back to contact with the surface of the collar.

In Figs. 1 and 5 I have shown a brake mechanism fixed in the mandrel and arranged to be made to press heavily upon the shaft H, as follows: The brake proper, K, is inserted in the opening $k$ and the end is made concave to bear upon the shaft fully one fourth of its circumference. This is held firmly against the shaft by means of a stiff spring $K''$ the tension of which is regulated by the screw $K'$, and the tension of said spring should be sufficient so that the shaft will move positively as soon as the collar $a'$ has been released and the rotary motion of the mandrel has been reversed.

The carriage bed G is secured within the head B by means of a shaft I that passes well back into a bearing in the mandrel C. This shaft is provided with a gear wheel J that is securely mounted on the shaft and is made to mesh with a corresponding gear wheel $J'$ that is slidingly mounted on the shaft H by means of a groove $j'$ in the shaft and a spline $j$ arranged to work freely in said groove but securely attached to the wheel $J'$, so that when the shaft H is made to revolve one half way around the table bed G will turn with it but in the opposite direction. This bed has a groove in opposite sides, as indicated at $i$ in Fig. 9, which are made of dovetail form to receive the carriages $G'$ and allow them to slide freely therein. These carriages are fitted at one end for the reception and firm support of the drill $g''$ and the tap $g'''$ or whatever tools are desired, and at the other end of each carriage I form an opening $g'$ into which the end $h'$ of the shaft H will pass freely as the table bed G is made to revolve sufficiently to carry the carriage to the proper point to be so engaged, where the carriages will be firmly held in position to be actuated to reciprocate longitudinally with the shaft H as said shaft is made to move to the right or to the left, as hereinbefore described. By this means the longitudinal movement of the drill carriage or the tap carriage, whichever may be engaged by the end of the shaft H, will be made to move positively either toward or away from the stock being operated upon, the drill $g''$ or the tap $g'''$ passing out of the head B through the opening $b$ which is centrally located in the end of the head.

The plate R is secured to the end of the mandrel C by means of bolts $r'$ passing through the holes $r$ in the plate and screwing into the end of the mandrel. The shaft H passes through the central hole $r''$ and the shaft I passes through the hole $r'''$. This plate is designed, first, to steady and support the shaft I, and, second, to hold the gear wheel $J'$ to place as the shaft H is made to move to the right or to the left in the operation of the machine. For the purpose of holding the carriage bed firm and in exact alinement I place a short shaft or pintle $I''$ in the hole $I'$ and pass it through the hole $b'$ in the end of the head B so this end of the bed cannot be diverged in the least from its proper position in the head.

In Fig. 1 I have shown a machine with which the stock carriage is to be manually operated by means of the levers E, as hereinbefore described. This machine has two direct driving belts, O and $O'$, and a reverse belt $O''$. The two first mentioned belts are designed to drive the mandrel over to the right or in the proper direction to operate a right handed drill and tap, and the belt $O''$ is designed to reverse the direction of the mandrel to draw the drill or tap away from the stock. In this machine the pulleys M and N are supposed to be firmly secured to the mandrel while the pulleys $M'$ and $N'$ are loosely mounted thereon, and they must work alternately, as, for instance, when drilling the stock the belt O is shifted onto the pulley M and the belt $O'$ must run on the loose pulley $N'$, and when the drilling is completed the belt O must be shifted onto the loose pulley $M'$, as indicated by its dotted lines in Fig. 1, and both belts must remain on the loose pulleys until the belt $O''$, which is shifted into operative action by means of a clutch mechanism, substantially as shown in Fig. 6, until the drill is moved back into the head B, when the belt O'' will be thrown out of operation and the belt O' may be shifted onto the pulley N and the operation repeated, except that the top $g'''$ will have taken the position formerly occupied by the drill $g''$. When this machine is used it is necessary to operate the belts all separately and for this purpose three several shifters are used. The shifter F is actuated by the carriage D by means of the pin $e'$ as indicated in Fig. 1, while the shifter F' is actuated by the lever E'', independent of the carriage D, being connected with said lever by means of a pin, as $e$, or other suitable way.

In Fig. 6 I have shown a machine designed as an automatic feed machine, in which but two belts are used. The belt O is the direct belt while O'' is the reverse belt. For this machine the driving shaft S has two loosely mounted pulleys, Q' and Q'' which are each provided with lugs to form clutch connection with the clutch Q, which clutch is shifted to alternately engage one pulley and then the other pulley by means of a shifter F''' which is operated by a proper connection, as $f$ on the carriage D engaging the lugs $f'$ on the bar F'' so that said clutch will be operated at the extreme ends of the travel of the carriage D as it is actuated by the screw shaft P as hereinbefore described.

I prefer the form of opening shown at $g'$ in the carriages G', and the form of head shown at $h'$ on the shaft H as they provide more margin for the safe entrance of the head into said openings than any other form of openings and heads would provide.

What I claim as new, and desire to secure by Letters Patent of the United States, is:

1. In a drilling and tapping machine, a supporting frame, a mandrel mounted on said frame and having a centrally located longitudinal opening, a shaft passing through said opening and having a screw thread upon it to act with a screw thread in the opening in the mandrel to move the shaft longitudinally, pulleys and belts for running said mandrel, an anchor collar and a trip connected with the back end of the shaft, a short shaft revolubly mounted in the end of the mandrel, a carriage bed mounted on said shaft, carriages mounted on said bed and arranged to connect alternately with the central shaft to be made to travel with said shaft longitudinal of the bed, and gear wheels on said shafts to actuate the short shaft as the central shaft is made to revolve.

2. In combination with the supporting frame of a drilling and tapping machine, a mandrel having a central opening its entire length, a screw thread cut in said opening, a shaft passing through said opening and having a screw thread to mesh with the screw thread in the mandrel, a collar connected to anchor the central shaft, a trip connected with said collar to release the central shaft at a given time, pulleys and belts connected with the mandrel to drive it alternately to the right and to the left, a stock carriage mounted on the frame, a short shaft revolubly mounted in the end of the mandrel, a hollow head mounted on the end of said mandrel, a carriage bed mounted on the short shaft, gear wheels on the central shaft and the short shaft arranged to cause the short shaft to revolve when the central shaft revolves, a carriage mounted on each side of the bed and having openings to engage the end of the central shaft when the short shaft is made to revolve so that the carriages will be made to alternately move toward and away from the stock carriage as the mandrel revolves to the right or to the left.

3. In combination with the supporting frame of a drilling machine, a mandrel mounted revolubly on said frame, and having a threaded opening through it lengthwise, a shaft passing through said opening and having a screw thread to mesh with the thread inside the mandrel, a hollow head mounted on one end of said mandrel, belts and pulleys arranged to cause said mandrel to revolve alternately to the right and to the left, shifters to manipulate said belts, a carriage bed revolubly mounted within the head, carriages mounted on said bed to slide longitudinally thereof, means for revolving the head and causing the carriage to engage the ends of the shaft alternately, an anchor collar mounted on the frame to anchor the shaft and cause it to move longitudinally as the mandrel is made to revolve, a brake mounted in the mandrel to act upon the shaft, a trip to release the anchor collar and allow the shaft to revolve with the mandrel at stated times, and a stock carriage acting in conjunction with the mandrel.

4. In a combined drilling and tapping machine, a supporting frame, a revoluble mandrel having an opening centrally located therein and belts and pulleys for revolving said mandrel, a shaft in the opening in said mandrel, said mandrel and shaft having co-acting means for moving said shaft longitudinally as the mandrel revolves, a brake, an anchor and a trip acting upon said shaft controlling its movements as the mandrel revolves, a hollow head on one end of the mandrel, a short shaft mounted in the end of the mandrel, gear wheels mounted to revolve said shaft at stated times, a bearing mounted on the end of the mandrel inside the head and in position to support the short shaft, and a stock carriage mounted on the frame, all as shown and described.

5. In a drilling and tapping machine, a supporting frame, a revoluble mandrel mounted on said frame, a revoluble bed mounted at the front end of said mandrel and to one side of the center thereof, carriages slidably mounted on said bed and arranged to be carried alternately to position concentric with the mandrel, and means for causing said carriages to reciprocate longitudinally of the bed.

Signed at Grand Rapids Michigan October 1, 1912.

ARTHUR W. COFFINGER, Jr.

In presence of—
JOHN W. HILDING,
I. J. CILLEY.

Copies of this patent may be obtained for five cents each, by addressing the "Commissioner of Patents, Washington, D. C."